T. E. MURRAY.
PIPE COUPLING.
APPLICATION FILED MAR. 22, 1918.

1,291,602.

Patented Jan. 14, 1919.
2 SHEETS—SHEET 1.

INVENTOR
Thomas E. Murray
BY
ATTORNEY

UNITED STATES PATENT OFFICE.

THOMAS E. MURRAY, OF NEW YORK, N. Y.

PIPE-COUPLING.

1,291,602.  Specification of Letters Patent.  Patented Jan. 14, 1919.

Original application filed February 16, 1918, Serial No. 217,494. (Patent No. 1,267,258, dated May 21, 1918.) Divided and this application filed March 22, 1918. Serial No. 223,889.

*To all whom it may concern:*

Be it known that I, THOMAS E. MURRAY, a citizen of the United States, residing at New York, in the county of New York and State of New York, have invented a certain new and useful Improvement in Pipe-Couplings, of which the following is a specification.

The invention is a pipe coupling formed of sheet metal in half sections electrically welded together at their edges, and provided with reinforcing rings, as hereinafter more particularly described.

This application is a division of my application Serial No. 217,494, filed February 16, 1918, which matured into Patent No. 1,267,258, dated May 21, 1918.

In the accompanying drawings—

Figure 1:
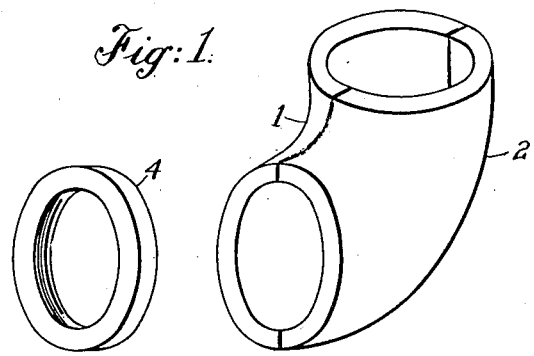
Figure 2:
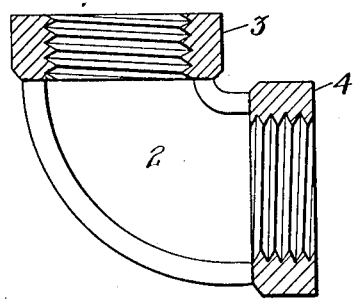
Figure 3:
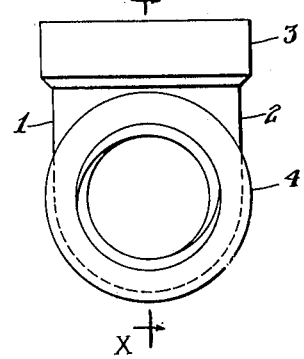
Figure 4:
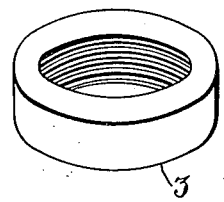
Figure 4:
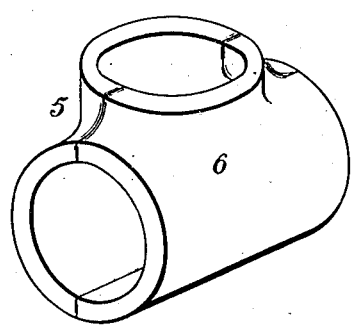
Figure 5:
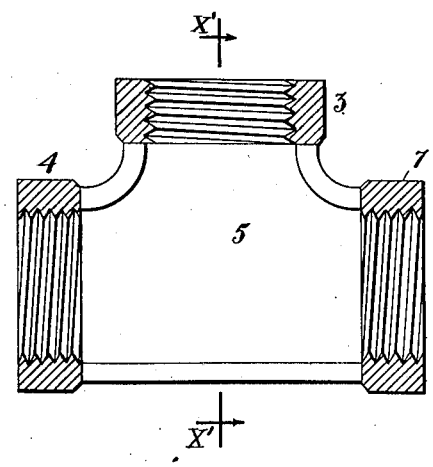
Figure 6:
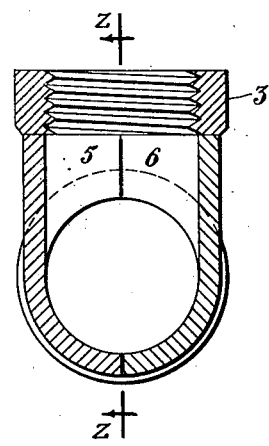

Figure 1 shows in perspective the body portion of an elbow pipe coupling made in accordance with my invention, and one of the reinforcing rings. Fig. 2 is a section of the completed coupling on the line X, X of Fig. 3. Fig. 3 is an end view of the completed coupling. Fig. 4 shows in perspective the body portion of a T pipe coupling made in accordance with my invention. Fig. 5 is a section of the completed coupling on the line Z, Z of Fig. 6. Fig. 6 is a section on the line X', X' of Fig. 5.

Similar numbers of reference indicate like parts.

The body portion of the elbow coupling, Figs. 1, 2, 3, is formed in two longitudinal half sections 1, 2, the said sections being preferably struck, pressed or stamped from sheet metal and welded at their meeting edges. To the ends of said sections are electrically welded reinforcing rings 3, 4, which may be internally threaded. Said rings may be drop-forged or produced exactly alike in any suitable way, and register with the ends of said body portion.

The T coupling shown in Figs. 4, 5, 6 has its body portion formed in two longitudinal half sections 5, 6, to the three ends of which are welded reinforcing rings 3, 4, 7, preferably internally threaded.

I claim:

1. As a new article of manufacture and sale, a pipe coupling, comprising two longitudinal half sections struck up from sheet metal and electrically welded edge to edge, and a reinforcing ring electrically welded to an end of said united sections.

2. As a new article of manufacture and sale, a pipe coupling, comprising two longitudinal half sections struck up from sheet metal and electrically welded edge to edge, and reinforcing rings electrically welded to the ends of said united sections.

3. A pipe coupling, as in claim 2, the said reinforcing rings being internally threaded.

In testimony whereof I have affixed my signature in presence of two witnesses.

THOMAS E. MURRAY.

Witnesses:
 GERTRUDE T. PORTER,
 MAY T. McGARRY.